US006457639B1

(12) United States Patent
McNamara et al.

(10) Patent No.: US 6,457,639 B1
(45) Date of Patent: Oct. 1, 2002

(54) MEDIA PROCESSING

(75) Inventors: Michael R. McNamara, Scotland (GB); Derek Zuckert, Scotland (GB)

(73) Assignee: NCR Corporation, Dayton, OH (US)

( * ) Notice: Subject to any disclaimer, the term of this patent is extended or adjusted under 35 U.S.C. 154(b) by 62 days.

(21) Appl. No.: 09/637,200

(22) Filed: Aug. 14, 2000

(30) Foreign Application Priority Data

Aug. 19, 1999 (GB) ............................................ 9919707

(51) Int. Cl.[7] ................................................ G06F 17/60
(52) U.S. Cl. ........................................ 235/379; 235/380
(58) Field of Search ............................ 235/379; 705/16

(56) References Cited

U.S. PATENT DOCUMENTS 4,997,076 A * 3/1991 Hirschfeld et al. ......... 194/212
5,719,383 A * 2/1998 Forrest ...................... 165/80.3
5,751,842 A * 5/1998 Riach et al. ................ 235/379
5,945,602 A * 8/1999 Ross .......................... 340/566
5,987,431 A * 11/1999 Johnston et al. ............ 209/534
6,064,990 A * 5/2000 Goldsmith .................. 235/379

FOREIGN PATENT DOCUMENTS

JP 59-194261 * 11/1984 .................. 705/24

* cited by examiner

*Primary Examiner*—Thien M. Le
*Assistant Examiner*—Lisa M. Caputo
(74) *Attorney, Agent, or Firm*—Francis L. Conte

(57) ABSTRACT

A method of processing media such as banknotes deposited in a SST in which a malfunction has occurred during the deposit operation is described. If a malfunction (12) occurs, the SST requests the user to enter the amount deposited (16), which amount is logged (20) by the SST. A receipt is provided with this information as well as contact details and details of the reconciliation process. The SST then deactivates (22). The SST operator may then clear the malfunction (24), reconcile the final transaction in order to ratify the deposit, and reactivate the SST (32).

18 Claims, 2 Drawing Sheets

MEDIA PROCESSING

BACKGROUND OF THE INVENTION

The present invention relates to self-service terminals (SSTs), and to methods of processing media deposited in an SST. In particular, the invention relates to methods of processing media when an error or failure occurs in the SST.

Self-service terminals (SSTs) are commonly used to conduct transactions involving valuable media, such as banknotes or checks. Such transactions may include making purchases, for example purchasing travel tickets, and settling utility bills, where it is necessary to deposit media into the SST to complete the transaction. Similarly, many automated teller machines (ATMs) provide a facility whereby media may be deposited into the ATM, for crediting to the user's bank account.

Such facilities may include a detector whereby the SST may determine the number and type of media deposited, for example the number of banknotes deposited and their denomination, and thus calculate the value of the deposit. The SST will then ask the user to confirm that this is the correct value, and, if so, proceeds with the transaction, making an internal record of the value of the deposit for subsequent auditing purposes. Alternatively, the SST may not have the facility to calculate the value of the deposit, and require the user to enter the value of the deposited media, which is then accepted. An internal record is made for subsequent auditing and comparison of the deposit with the record.

Previously, SSTs have been provided with input arrangements which require media such as banknotes to be deposited "one at a time", by feeding individual banknotes into a deposit slot. However, this process may be unacceptably slow for many users, for example shopkeepers wishing to deposit the day's takings in an ATM. Accordingly, more recently developed ATMs include the facility to deposit bundles of banknotes, which notes are then picked from the bundle and processed relatively quickly. However, SSTs and ATMs may malfunction occasionally, particularly where the terminal is processing deposited media: perhaps the most common malfunction is the result of deposited media, such as old, soiled or damaged banknotes, jamming in the input mechanism of a terminal. In such instances, the conventional SST response is to deactivate immediately to avoid exacerbating the malfunction. A service engineer must then be contacted to repair and reactivate the SST.

In such situations, the user may find that they have deposited some valuable media, and the SST has then deactivated with no indication that the partial deposit has been acknowledged or accepted, and no means of proving that a deposit was made. Not only does this result in stress and frustration for the user, but there may also be problems associated with the subsequent manual auditing of the SST, as there is no record corresponding to the last "partial" deposit. This is particularly so with SSTs which calculate the value of the deposit, as typically no transaction record is produced until all of the media have been deposited in the SST and the deposit element of the transaction completed. As a result, it is necessary to reconcile the whole machine to determine the "excess" represented by the incomplete deposit, which will often necessitate the depositor waiting until the next day of business before the value of the incomplete deposit is confirmed.

SUMMARY OF THE INVENTION

It is among the objects of embodiments of the present invention to obviate or alleviate these and other disadvantages of the prior art.

According to one aspect of the present invention, there is provided a method of processing media deposited in a self-service terminal (SST) where a malfunction has occurred during the course of a deposit operation and has interrupted the deposit operation, the method comprising the steps of:

requesting the user to enter the value of the deposit made prior to the interruption of the deposit operation;

logging the entered value;

providing a receipt for the deposit; and deactivating the SST.

This method minimizes the stress experienced by the user by providing a receipt, preferably in the from of a hard copy, which confirms that a deposit has been made, rather than deactivating immediately without providing the user with any form of record or acknowledgement of their partial deposit. The user may then present this receipt to prove that they had indeed made a deposit. Further, the step of inputting the value of the deposit provides a record which may subsequently be checked during manual auditing, so making this task easier for the SST operator. During or following a malfunction it may not be possible or advisable to use or rely upon an automated media valuation facility, as this may be associated with the malfunction. However, manual auditing of the final deposit will tend to be relatively straightforward, as deposited items are typically held in "escrow", separate from the main media storage facility within the terminal, until the deposit is completed; thus, after a malfunction, an auditor need only confirm the value of media in escrow (and any recovered "jammed" notes) as representing the value of the interrupted deposit.

Preferably, the method further comprises the step of:

reconciling the value of said deposit against the logged value.

The method may also comprise the step of contacting the user if the actual value of the deposit and the logged value do not reconcile, to resolve the difference.

Preferably, the method further comprises providing at least contact details for the user to allow the user to contact the SST operator following deactivation of the SST. These contact details may be provided along with or as part of the receipt, and will further serve to reassure the user. In addition, the user may be provided with details of the reconciliation procedure. The user may also be allowed to enter contact details, such as a temporary address or telephone number, in the event that the owner of the SST desires to contact the user and the user is not presently resident at their home address. This has the advantage that if the user is located away from his normal residence (for example, on a business trip or on holiday) then he/she can be contacted at a temporary address.

The SST may incorporate a journal printer or the like for creating a hard copy of the terminal transactions, and the method may further comprise creating a special reference in the terminal journal containing details of the interrupted deposit, further facilitating rapid reconciliation.

BRIEF DESCRIPTION OF THE DRAWING

These and other aspects of the present invention will now be described by way of example only, and with reference to the accompanying FIG. 1 which is a schematic representation of a self-service terminal, and FIG. 2 which is a flow chart representing a transaction flow in accordance with an embodiment of the present invention.

DETAILED DESCRIPTION

Figure 1:
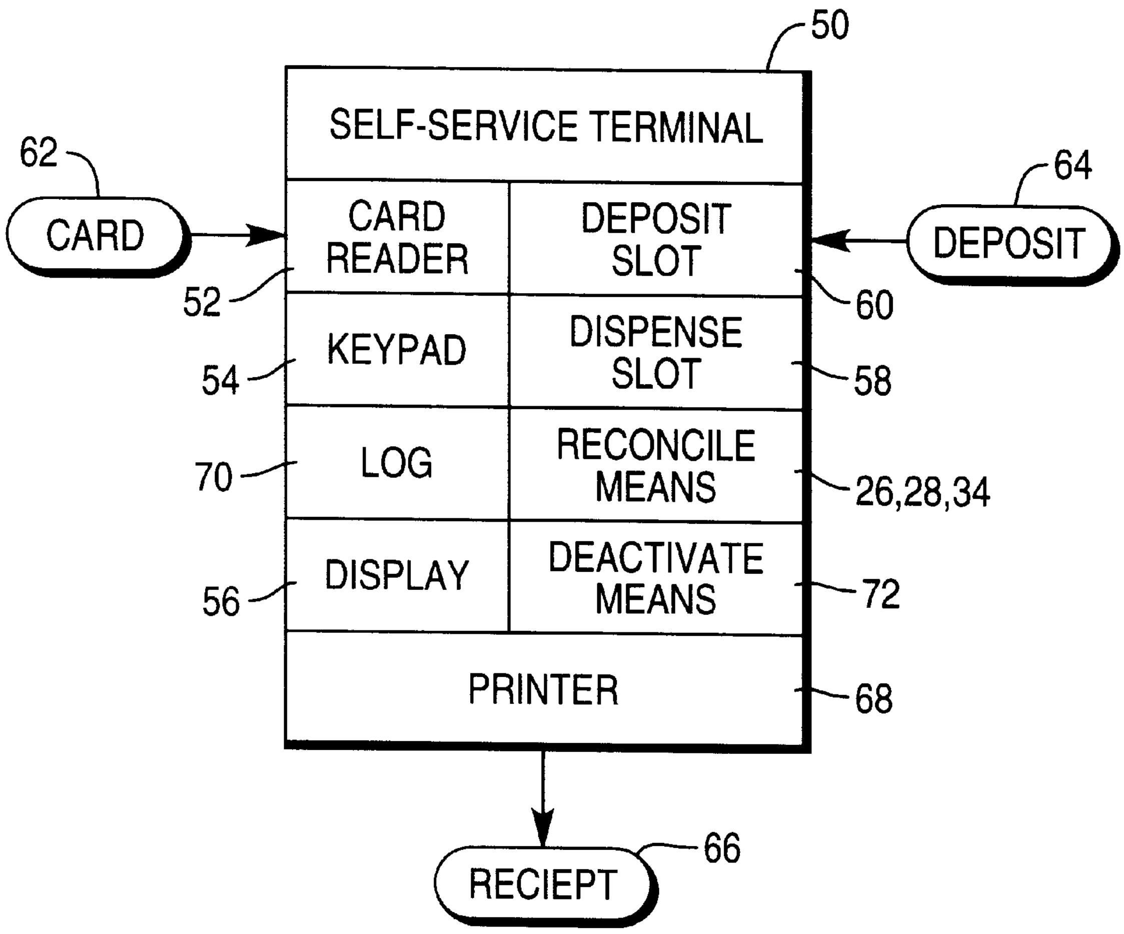

A self-service terminal (SST) 50 is illustrated schematically in FIG. 1 and typically comprises a number of user interfacing elements such as a magnetic card reader 52, keypads 54, a display 56, and cash dispense and deposit slots 58,60. During a typical transaction, a user will insert their magnetic strip card 62 into the card reader, and type their PIN on the keypad. After selecting the desired transaction, such as depositing banknotes 64, the banknotes are fed into the deposit slot of the SST. The SST determines the value of the deposited items, prints a receipt 66 using its printer 68, and returns the user's card.

Figure 2:
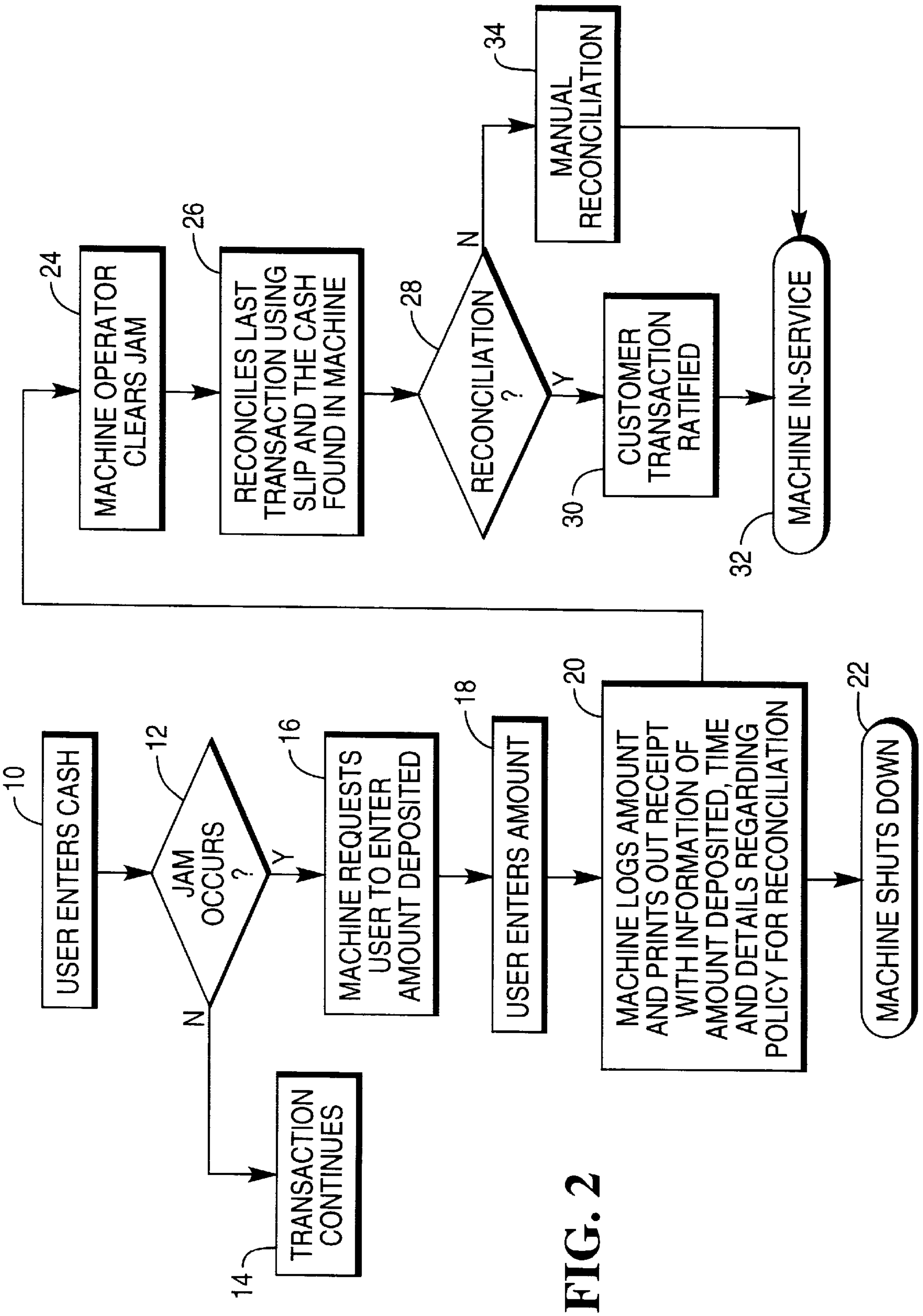

FIG. 2 illustrates possible transaction flows involving the deposit of cash in the SST 50 shown in FIG. 1, at least one of the transaction flows being in accordance with an embodiment of the present invention. The application of the present method to the operation of a self-service terminal (SST) as illustrated in FIG. 2 commences, at step 10, with the user entering a deposit 64 of cash, checks, vouchers or other media into the SST; for brevity, the method will be described below with reference to the deposit of banknotes. In the great majority of transactions, the cash input will proceed without incident and the transaction will continue 14 to a normal conclusion. The normal course of the transaction may include automatically determining the value of the deposited notes and proceeding accordingly, and may require the user to input or confirm the value of the deposit. In cases where the terminal does not itself determine the value of the deposit, the transaction will not be confirmed until the deposit has been manually confirmed.

If a banknote jam or other malfunction occurs 12, the SST then requests the user to enter the value of the cash deposited up to that point 16; the terminal may, for example, produce an appropriate message on the screen display 56, accompanied by an aural alert. The user then enters the value of the banknotes deposited before the jam occurred 18; this may conveniently be via a conventional SST keypad 54, a touch screen display or the like. The SST then logs the entered value of the media 20, possibly on an internal printed record or journal, or in computer memory 70; and prints a receipt 66 for the user. The entered value is the value that the user claims to have entered. The receipt 66 provides details such as the amount of the deposit that the user has claimed to have entered, and the time of the deposit, and perhaps an identification tag to associate the receipt with the deposit. The receipt may also include, for example, a telephone number or other contact details for the user, and a statement giving details of the SST operator's policy for reconciliation.

The SST will then deactivate 22 using deactivation means 72 contained therein, to await a service engineer to resolve the malfunction. During the deactivation the SST may also display further messages on a screen or other display means to provide information or reassurance to the user.

Subsequently, a machine operator will clear the media jam 24 or otherwise resolve the malfunction. Using the logged value of the deposit, and the internally recorded value of the deposit, if any, and also possibly the retrieved deposit itself (if in escrow), the operator will then reconcile these values 26. If the values agree 28, the user's transaction is ratified 30, the deposit credited to the user's account and the SST reactivated 32 for further use.

If there is however a discrepancy between the logged value and the terminal recorded value or the cash found in the machine 28, a manual reconciliation 34 takes place. This may involve auditing all of the terminal transactions prior to the malfunction, referring to other sources of information, such as video tape recordings from close circuit cameras, and contacting the user to discuss the discrepancy and thereby resolve the situation. While the manual reconciliation 34 is being carried out, the SST may be returned to service and reactivated 32.

It will be apparent that the foregoing provides an effective method whereby the inevitable user stress and frustration experienced when an SST malfunctions may be at least reduced. The time and effort involved in reconciling incomplete transactions is also simplified; if there is agreement between the value of the deposit as identified by the user and the value of the deposit held in escrow the matter may be resolved in a very short time, and the terminal returned to service. It will be appreciated that a user only has to enter details of the deposit in the event of the SST malfunctioning, thereby saving time compared with systems that require the user to enter the amount deposited prior to each deposit. It will further be apparent that the foregoing is for illustrative purposes only, and that various improvements or modifications may be made to the method described herein without departing from the scope of the invention.

What is claimed is:

1. A method of processing media deposited in a self-service terminal (SST) where a malfunction has occurred during the course of a deposit operation and has interrupted the deposit operation, the method comprising the steps of:

requesting a user to enter the value of the deposit made prior to the interruption of the deposit operation;

logging the entered value;

providing a receipt for the deposit; and deactivating the SST.

2. A method according to claim 1, further comprising the step of:

reconciling the value of the deposit against the logged value.

3. A method according to claim 2, further comprising the step of:

contacting the user if the actual value of the deposit and the logged value do not reconcile, in order to resolve the difference.

4. A method according to claim 1, further comprising the step of:

providing contact details for the user to allow the user to contact the SST operator following deactivation of the SST.

5. A method according to claim 4, wherein the contact details are provided as part of the receipt.

6. A method according to claim 1, further comprising the step of:

creating a special reference in a terminal journal of the SST containing details of the interrupted deposit.

7. A method of operating a self-service terminal (SST) when a deposit operation is interrupted due to a malfunction, the method comprising the steps of:

requesting a user to enter the value of the deposit made prior to the interruption of the deposit operation;

logging the value entered by the user;

providing to the user a receipt for the deposit; and deactivating the SST when the receipt is provided to the user.

8. A method according to claim 7, further comprising the step of:

reconciling the value of the deposit against the logged value.

9. A method according to claim 8, further comprising the step of:

contacting the user if the actual value of the deposit and the logged value do not reconcile, in order to resolve the difference.

10. A method according to claim 7, further comprising the step of:

providing contact details for the user to allow the user to contact the SST operator following deactivation of the SST.

11. A method according to claim 10, wherein the contact details are provided as part of the receipt.

12. A method according to claim 7, further comprising the step of:

creating a special reference in a terminal journal of the SST containing details of the interrupted deposit.

13. A self-service terminal (SST) for receiving deposits, the self-service terminal comprising:

means for requesting a user to enter the value of a deposit made prior to interruption of the deposit operation due to a malfunction;

means for logging the value entered by the user;

means for providing to the user a receipt for the deposit; and means for deactivating the SST when the receipt is provided to the user.

14. A self-service terminal according to claim 13, further comprising means for reconciling the value of the deposit against the logged value.

15. A self-service terminal according to claim 14, further comprising means for contacting the user if the actual value of the deposit and the logged value do not reconcile, in order to resolve the difference.

16. A self-service terminal according to claim 13, further comprising means for providing contact details for the user to allow the user to contact the SST operator following deactivation of the SST.

17. A self-service terminal according to claim 16, wherein the contact details are provided as part of the receipt.

18. A self-service terminal according to claim 13, further comprising means for creating a special reference in a terminal journal of the SST containing details of the interrupted deposit.

* * * * *